United States Patent
Barnes et al.

(10) Patent No.: US 8,352,105 B2
(45) Date of Patent: Jan. 8, 2013

(54) UNMANNED UNDERWATER VEHICLE INTEGRATED RADIATION DETECTION SYSTEM

(75) Inventors: James G. Barnes, Los Angeles, CA (US); Thomas R. Austin, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 885 days.

(21) Appl. No.: 12/371,379

(22) Filed: Feb. 13, 2009

(65) Prior Publication Data

US 2011/0077799 A1  Mar. 31, 2011

(51) Int. Cl.
*B63C 11/00* (2006.01)
*B63B 3/56* (2006.01)
(52) U.S. Cl. .......................................................... 701/21
(58) Field of Classification Search ................ 701/2, 21, 701/400; 114/56.1, 73, 78, 116, 312; 405/1, 405/195.1; 250/370.11, 390.11
See application file for complete search history.

(56) References Cited

U.S. PATENT DOCUMENTS

| | | | |
|---|---|---|---|
| 6,484,660 B1 * | 11/2002 | English | 114/312 |
| 7,773,204 B1 * | 8/2010 | Nelson | 356/5.02 |
| 2006/0117164 A1 * | 6/2006 | Coxe et al. | 712/15 |
| 2009/0050812 A1 * | 2/2009 | Dunleavy et al. | 250/368 |
| 2010/0102813 A1 * | 4/2010 | Schulz et al. | 324/309 |
| 2010/0277345 A1 * | 11/2010 | Rodriguez et al. | 340/945 |

OTHER PUBLICATIONS

Knoll, Glenn F., Radiation Detection and Measurement, 2nd Ed., pp. 274-278, John Wiley & Sons, Mar. 6, 1989.
U.S. Department of Energy, National Nuclear Security Administration, "Aerial Measuring System (AMS)", Mar. 25, 2005.
BC-490, Material Brochure, Saint-Gobain Crystals, 17900 Great Lakes Pkwy, Hiram, OH 44234-9681, downloaded from the internet Jan. 4, 2010 at http://www.bicrondirect.com/plast.htm.

* cited by examiner

*Primary Examiner* — Mary Cheung
(74) *Attorney, Agent, or Firm* — Felix L. Fischer

(57) ABSTRACT

An unmanned underwater vehicle incorporates a structure having an integral scintillating material for a radiation detector and detection electronics connected to the radiation detector for measurement of the scintillation. A communication system is employed for transmission of scintillation measurement to a remote facility and a navigation control system provides for autonomous operation of the unmanned underwater vehicle or remote operation through the communications system.

10 Claims, 6 Drawing Sheets

UNMANNED UNDERWATER VEHICLE INTEGRATED RADIATION DETECTION SYSTEM

BACKGROUND INFORMATION

1. Field

Embodiments of the disclosure relate generally to the field of radiation detection systems and more particularly to embodiments for underwater vehicles with materials capable of detecting and collecting samples of photon and possibly neutron ionizing types of radiation fields incorporated as integral structural members in the vehicle.

2. Background

Terrorist groups and rogue nation states have threatened to utilize radiological and nuclear materials as threat weapons against the United States and other countries in the world. Storage and transportation of these materials and weapons would likely occur in maritime vessels or seaport facilities that are difficult to access by manned-missions. An unmanned underwater vehicle (UUV) could be covertly sent in to such a vessel or facility to conduct radiological field measurement evaluations in the vicinity of the suspect target(s). However, large radiation detector volumes and corresponding weights are generally required for detector sensitivity making deployment of conventional detection systems in a UUV unworkable due to size constrains.

Current solutions utilize manned teams employing handheld radiation detectors, manned aircraft with solid-state detector payloads, and large unmanned air vehicles (UAVs) with miniaturized solid-state radiation detector payloads. These solutions have disadvantages and limitations because they expose the manned teams, manned aircraft and/or UAV systems to safety and security related consequences with the potential likelihood of interdiction, capture and/or awareness by the enemy because of the large signature associated with their presence, and hence limit covert and overt mission capabilities. Solid state radiation detectors generally are characterized with low detector volumes, and thus are not as efficient as large radiation scintillator systems for detection of energized photons. This is due to the interaction physics within the radiation detector and the statistical likelihood of interaction between the radiation photons to be measured and the volumetric size of radiation detectors.

It is therefore desirable to provide a radiation detection system which can be effectively deployed in a UUV with sufficient detector volume for reliable operation. It if further desirable that such a UUV have capability to include spectrometry devices that would permit isotope identification. It is further desirable that the UUV incorporate an operator directed or autonomous steering system to permit the device to be directed to an area of interest, or would permit the craft to troll in areas of interest with little or no operator intervention.

SUMMARY

Exemplary embodiments provide an unmanned underwater vehicle which incorporates a structure having an integral scintillating material for a radiation detector and detection electronics connected to the radiation detector for measurement of the scintillation. The structure in one exemplary embodiment includes at least one structural member incorporating a scintillation material and the radiation detector includes a plurality of photodiodes interfaced to the scintillation material for detection of radiation induced scintillation in the at least one structural member.

In a first construct the structural member incorporating the scintillation material is fabricated from a cast resin while in an alternative construct, multiple composite material sheets interspersed with scintillator plies are employed. For the exemplary embodiment, the composite material sheets and the scintillator plies are arranged as alternating concentric cylindrical elements.

A communication system is employed for transmission of scintillation measurement to a remote facility and a navigation control system provides for autonomous operation of the unmanned underwater vehicle or remote operation through the communications system. A GPS system is connected to the communications system and navigation control system for position determination.

A radiation detection system is provided by an unmanned underwater vehicle (UUV) having at least one structural member incorporating a scintillating material integrated into the hull and a plurality of photodiodes interfaced to the scintillation material for detection of radiation induced scintillation in the at least one structural member. Detection electronics carried within the hull are connected to the photodiodes for measurement of the scintillation. A remote monitoring station receives measurement of the scintillation from the detection electronics.

In one exemplary embodiment, the UUV further incorporates a navigation control system and a communications system for communication between the detection electronics and the remote monitoring station.

The features, functions, and advantages that have been discussed can be achieved independently in various embodiments of the present invention or may be combined in yet other embodiments further details of which can be seen with reference to the following description and drawings

DETAILED DESCRIPTION

The embodiments disclosed herein provide an unmanned underwater vehicle (UUV) with scintillation plastics incorporated in the hydro-structure. The detector volume is not an additional weight that must be borne by the underwater vehicle which may allow for smaller UUV systems. Since the detector scintillator is integral to the basic structural weight of the UUV a reduction in overall weight of the underwater vehicle and payload can be achieved. Additionally, integration of the scintillator into the structure of the UUV permits a relatively large volume of radiation detector(s) to be housed within the underwater vehicle that provide a more accurate and more covert means of detecting radiation fields.

Figure 1:
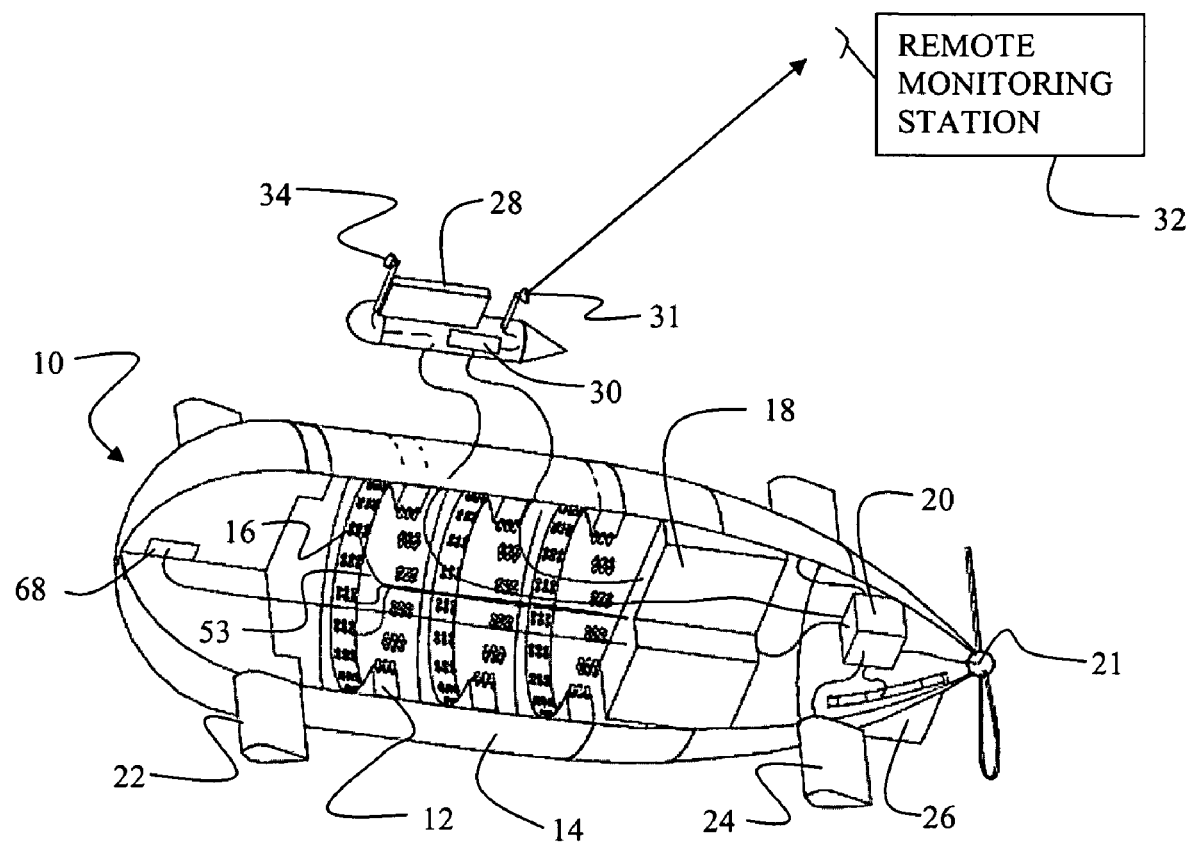
FIG. 1 is an isometric section view of an exemplary embodiment of a UUV.

As shown in FIG. 1, a UUV 10 employs bulkhead structural members 12 which are fabricated from scintillator plastics as will be described in greater detail subsequently. The bulkhead structural members are integrated into the hull 14 of the UUV. Detecting diodes 16 are interfaced to the scintillator plastic and connected to a detection electronics suite 18 carried in the UUV. For the embodiment shown, the UUV incorporates a vehicle control system 20 which provides navigational capability for the UUV through propulsion unit 21, hydroplanes 22, 24 and rudder 26. A snorkeling communications float 28 may be employed for radio communications from and to the UUV through communications system 30 and antenna 31 for data transfer of the radiation detection information to a remote monitoring station 32 and command input for remote operator controlled navigation of the UUV. The vehicle control system 20 may include memory and processing capability for programmable navigation profiles for autonomous operation of the UUV. A global positioning system (GPS) antenna 34 on the communications float provides position data to the control system and/or the remote operator through the communications system.

Figure 2:
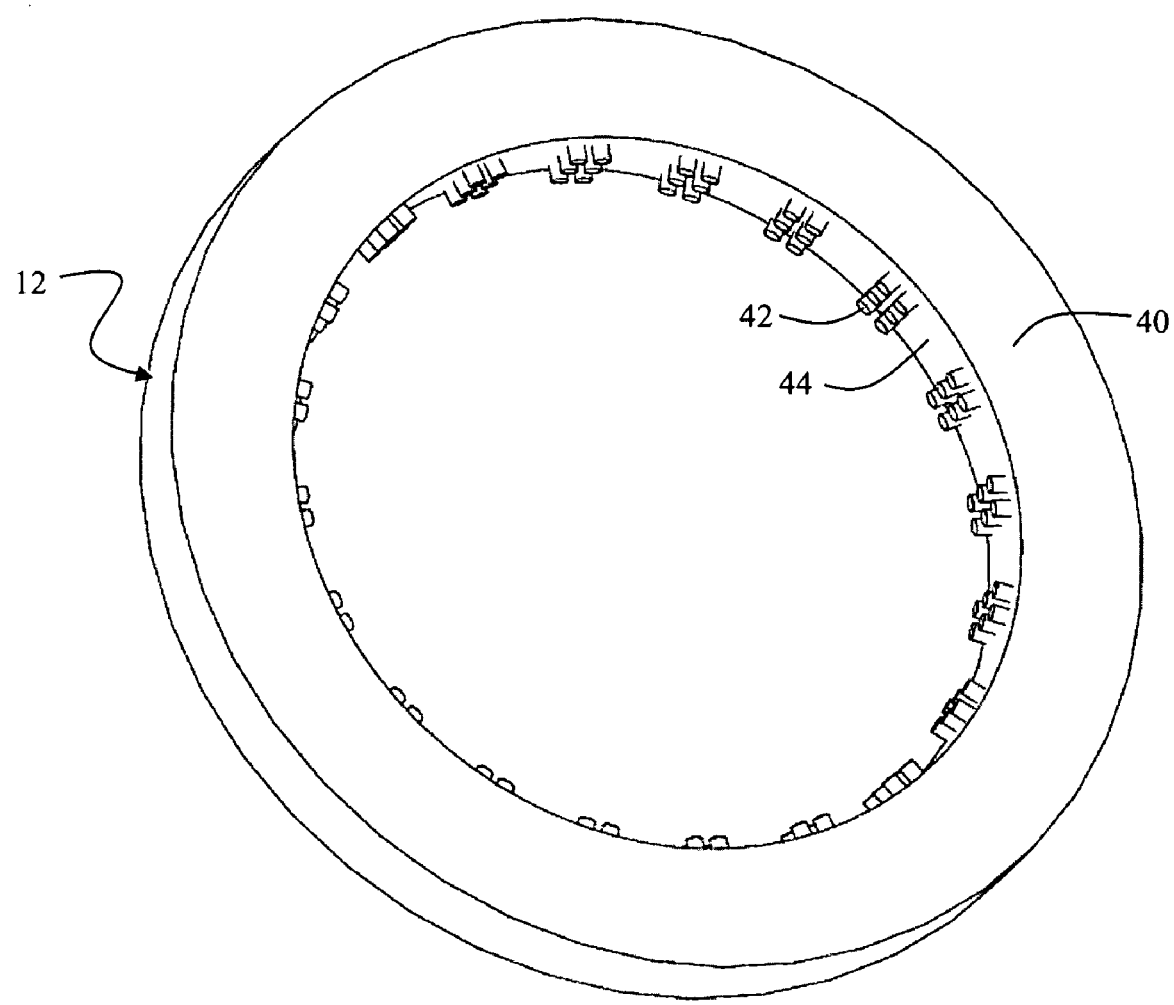
FIG. 2 is an isometric section view of a first configuration of a scintillation detector for use with the embodiment of FIG. 1.

A first exemplary configuration for the scintillator detector is shown in FIG. 2. A plastic scintillator material 40, which may be a resin cast into the desired structural shape or plastic machined for the desired shape, captures radiation particles for interaction to create scintillation. Organic or crystalline scintillation material may be employed in the detectors. For exemplary embodiments, plastic scintillators are generally composed of organic scintillators which have been polymerized into a plastic substrate (e.g. polyvinyltoluene and polystyrene). Alternatively, crystalline scintillators may be employed such as metallic halides that scintillate when interacting with ionizing radiation. While Sodium Iodide doped with Thallium (NaI(Tl)), is the most commonly used, there are a number of other compounds that display this behavior that would be applicable for use with the embodiments disclosed herein. The organic or crystalline scintillator materials convert the energy of incident photons into light. Photodiodes 42 such as the C30902 series Silicon Avalanche Photodiode produced by PerkinElmer are distributed on a detection surface 44 to collect the light emissions which are then electronically converted into a count rate or into an integrated count by the detection electronics suite.

Figure 3:
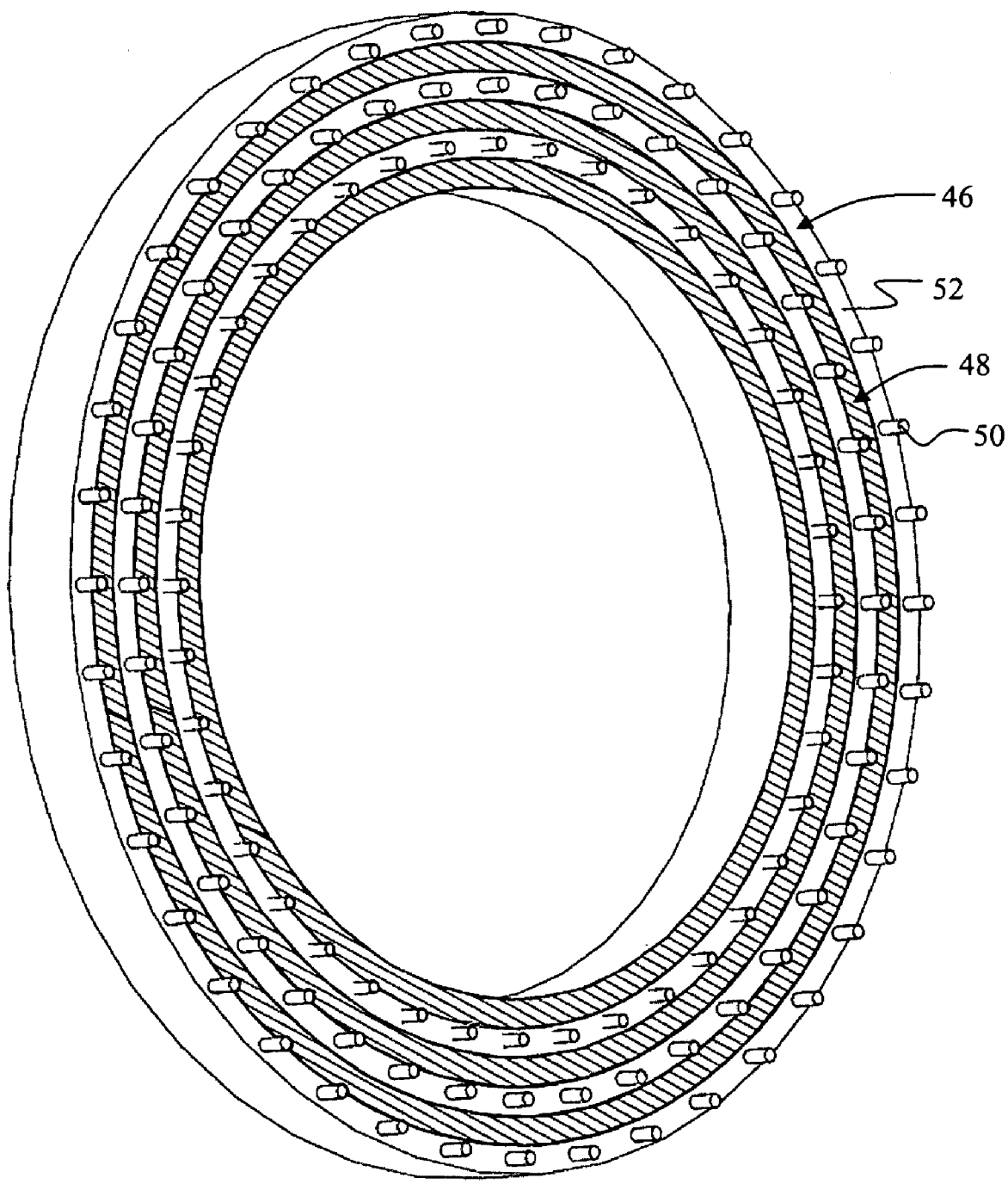
FIG. 3 is an isometric section view of a second configuration of a scintillation detector for use with the embodiment of FIG. 1.

The scintillating structural components can be composed of solid elements of organic scintillators as shown in FIG. 2, or multiple thin elements of organic or crystalline scintillator plies 46 sandwiched between multiple plies of composite material sheets 48 as shown in FIG. 3. For the exemplary embodiment of FIG. 1, the alternating scintillator plies 46 and structural composite material sheets 48 are nested concentric cylindrical elements forming the bulkhead structural components or alternatively self supporting cylindrical hull sections. As shown in FIG. 3, detecting diodes 50 are located on detection surfaces 52 of each scintillator ply.

Figure 4:
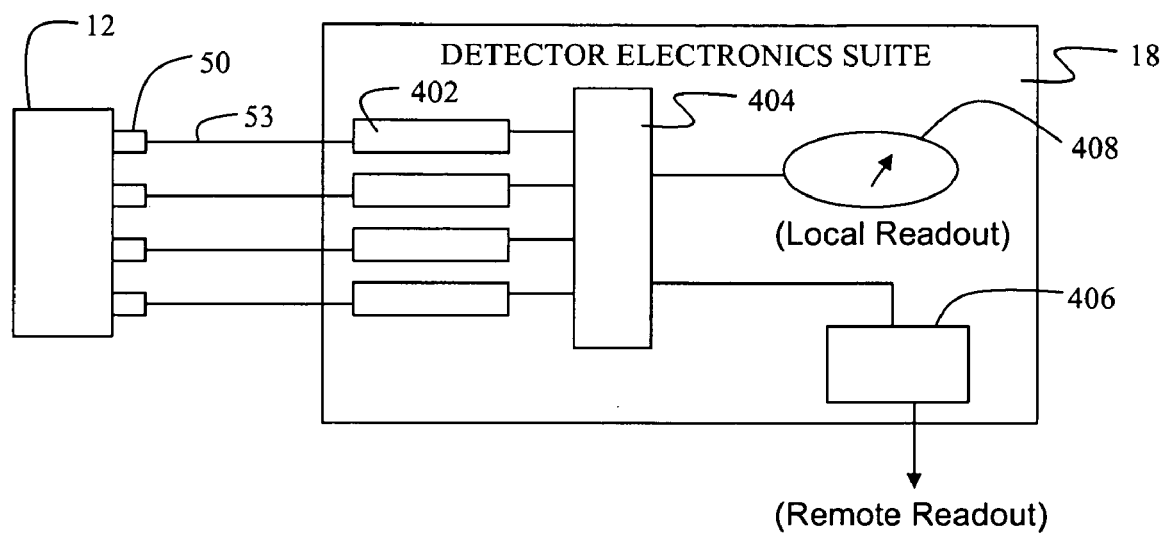
FIG. 4 is a block diagram of the detector system elements.

FIG. 4 shows the detector electronics suite in greater detail. Transmission cables 53 from the detecting diodes 50 are routed internal to the hull of the UUV to the detector electronics suite 18. The electronics suite incorporates signal pulse amplifiers 402, which receive the signals from the array of photodiodes 50 bonded to the scintillation material 12 with a light conductive adhesive and to cables 53. An integrating scaler 404 allows conversion into a count rate or into an integrated count allowing detection and classification of radiation sources. The integrated values are passed through a transmitter 406 to the communication system 30 and antenna 31 snorkling communications float for reception by the remote monitoring station. A local readout 408 may be provided for calibration. Directional location of the radiation source is accomplished by providing individual amplification and readout for each photodiode rather than multiplexing the diodes to a common counting scaler; the correlation of greater or lesser count rate for each photomultiplier is easily correlated to relative direction to the axis of the UUV. Communication between the detector electronics suite and the navigation system allows automated control for navigation of the UUV to bring the UUV into proximity of the radiation source for enhanced measurement. Alternatively, transmission of the directional information to a remote operator allows remotely controlled maneuvering of the UUV for optimizing enhanced radiation measurement.

Figure 5:
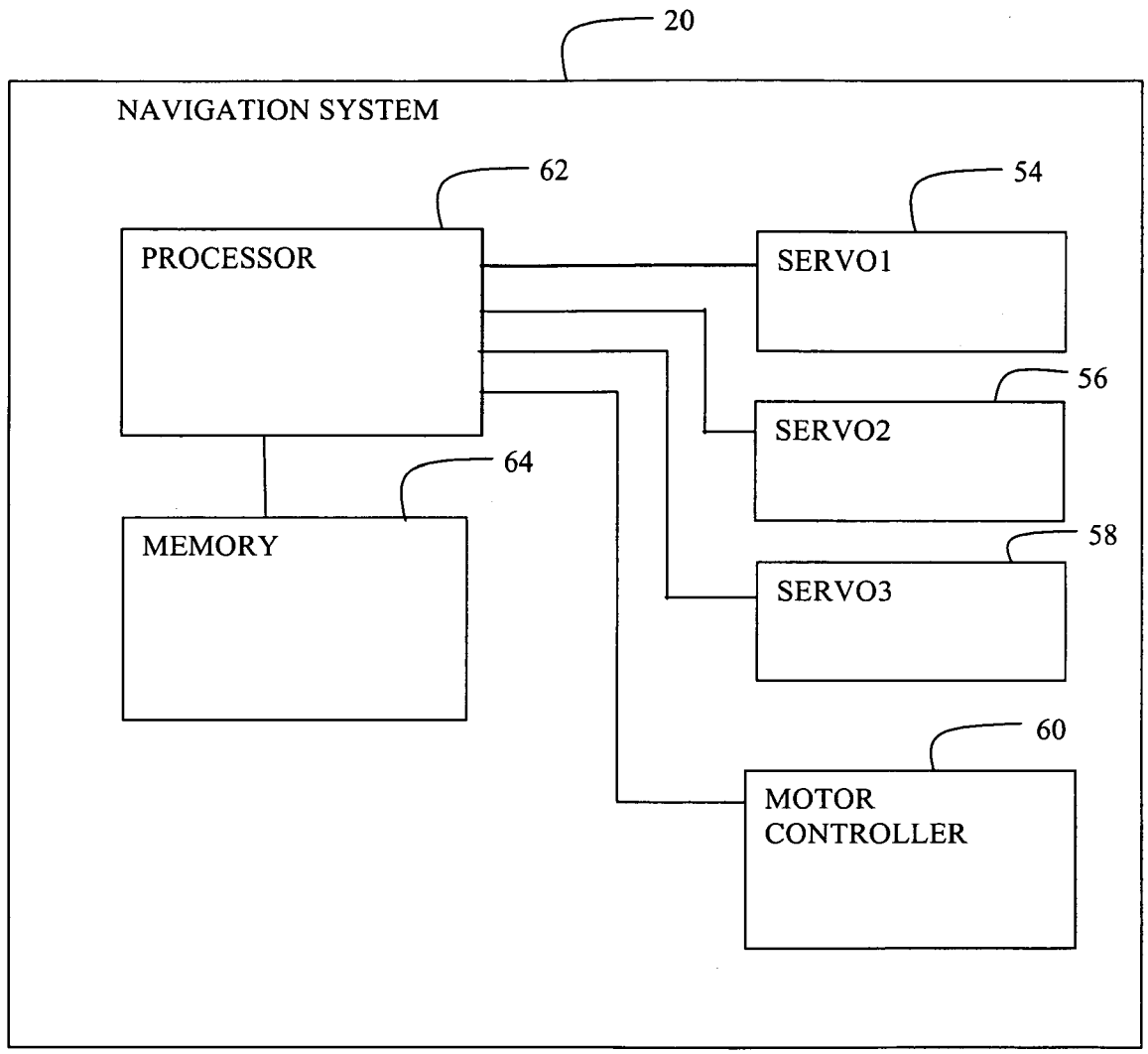
FIG. 5 is a block diagram of the navigation system.

As shown in FIG. 5, the navigation system 20 provides control for the vehicle through servo actuators 54, 56 and 58 for the hydroplanes 22 and 24 and the rudder 26 respectively. While multiple sets if hydroplanes are shown in the exemplary embodiments alternative depth control systems may be employed. Motor control 60 for the propulsion system 21 is also included. As previously described, a central processing unit 62 and memory 64 are included for programming and control of the actuators for autonomous or remote operation.

Further, as also shown in FIG. 1, volume on or in the hull 14 of the UUV will be available for the inclusion of crystalline or solid state gamma spectroscopy detectors 68 providing data to the detection electronics suite 18, which would permit isotope identification. The large volume of the scintillation detectors may allow directional determination of the radiation source as previously described. Data interface between the detection electronics suite and the vehicle control system may be employed for automated closure by the UUV with the suspected radiation source or directional data transmitted from the UUV may allow operator control for navigation of the UUV to achieve closer approach to the radiation source for enhanced radiation measurement.

Figure 6:
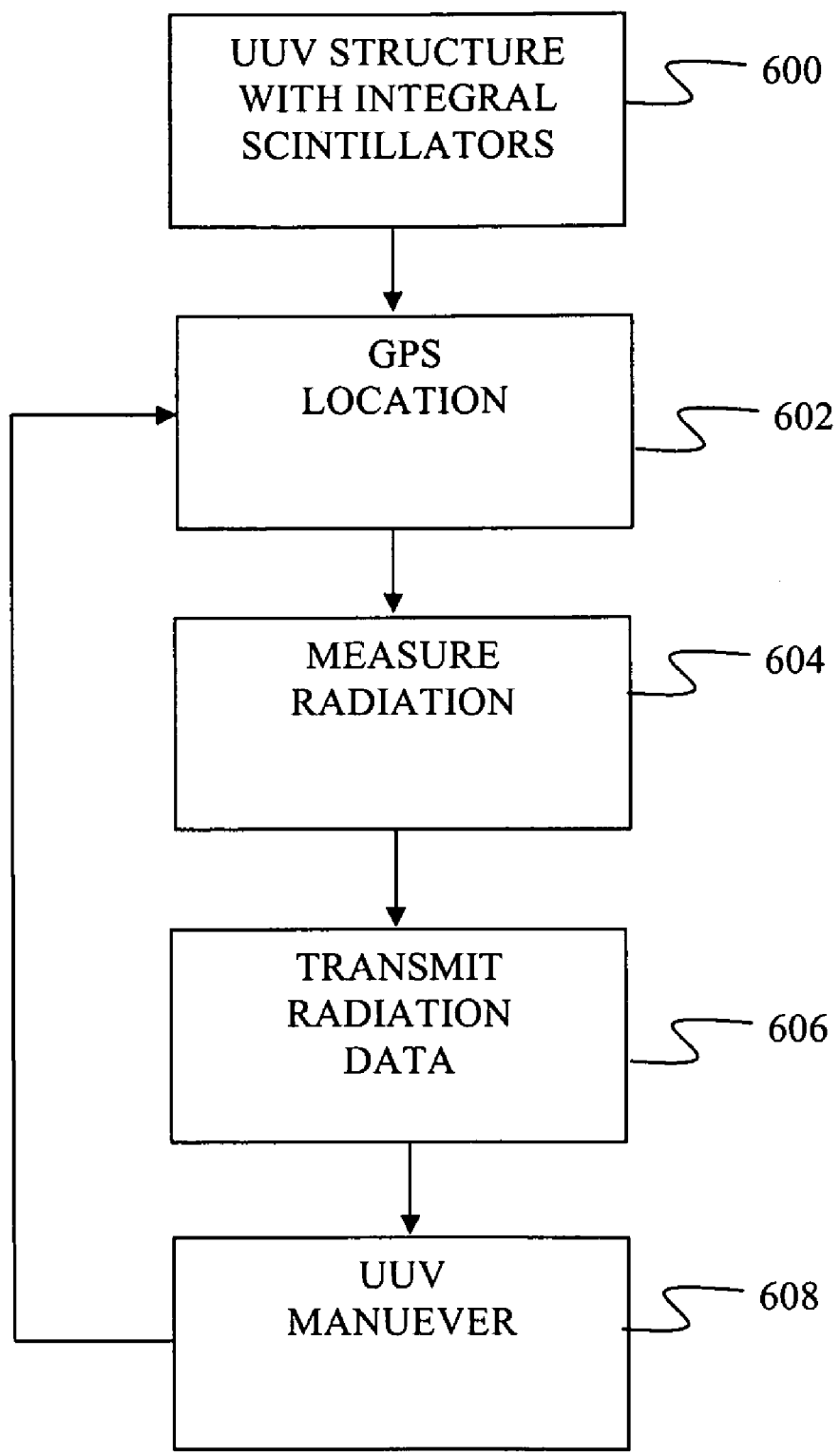
FIG. 6 is a flow chart of the operational method for the embodiment of FIG. 1.

UUVs of the embodiments described would be capable of performing sensitive radiation surveys by deploying larger detector volumes than could otherwise be housed in an "add-on" instrument package currently in use by security agencies. As shown in FIG. 6, the UUV fabricated with integral structural scintillating detectors as shown in step 600 would be capable of receiving a GPS location, step 602, generating a radiation measurement using the integral structural scintillators, step 604, and then transmitting this data, step 606, through a communications system to a remote or stand-off sea, land or air-based monitoring station for real-time radiation field mapping, analyses and forensics. The UUV is then maneuvered, autonomously with a pre programmed search pattern or by a remote operator through the communications system, step 608, to enhance measurement of any radiation detected or patrol for any radiation source. This approach also allows the detection system to dwell at a location for a considerable period of time, which permits the collection of a more accurate and exact measurement of radiation levels and energy spectra in an area.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An unmanned underwater vehicle comprising:
 a structure having at least one structural member fabricated from a plastic scintillating material incorporating a plurality of composite material sheets interleaved with a plurality of scintillator plies as alternating concentric cylindrical elements forming a bulkhead with a radiation detector having plurality of photodiodes distributed on a detection surface of the bulkhead;

detection electronics connected to the radiation detector for measurement of the scintillation.

2. The unmanned underwater vehicle of claim 1 wherein the scintillation material comprises an organic scintillator bonded into a plastic substrate.

3. The unmanned underwater vehicle of claim 1 wherein the scintillation material comprises a crystalline scintillator selected from the set of metal halides.

4. The unmanned underwater vehicle of claim 1 wherein the structural member incorporating the scintillation material comprises a cast resin.

5. The unmanned underwater vehicle of claim 1 wherein the structural member incorporating the scintillation material comprises a machined plastic.

6. The unmanned underwater vehicle of claim 1 further comprising a communication system for transmission of scintillation measurement to a remote facility.

7. The unmanned underwater vehicle of claim 1 further comprising a navigation control system.

8. The unmanned underwater vehicle of claim 7 wherein in the navigation control system is programmable for autonomous operation.

9. The unmanned underwater vehicle of claim 7 further comprising a communications system and wherein the navigation control system is remotely operable through the communications system.

10. The unmanned underwater vehicle of claim 9 further comprising a GPS system connected to the communications system and navigation control system for position determination.

* * * * *